(12) United States Patent
Chen

(10) Patent No.: US 11,256,147 B2
(45) Date of Patent: Feb. 22, 2022

(54) ARRAY SUBSTRATE AND LIQUID CRYSTAL PANEL

(71) Applicant: SHENZHEN CHINA STAR OPTOELECTRONICS SEMICONDUCTOR DISPLAY TECHNOLOGY CO., LTD., Shenzhen (CN)

(72) Inventor: Jiangchuan Chen, Shenzhen (CN)

(*) Notice: Subject to any disclaimer, the term of this patent is extended or adjusted under 35 U.S.C. 154(b) by 204 days.

(21) Appl. No.: 16/626,340

(22) PCT Filed: Nov. 8, 2019

(86) PCT No.: PCT/CN2019/116760
§ 371 (c)(1),
(2) Date: Dec. 24, 2019

(87) PCT Pub. No.: WO2021/042514
PCT Pub. Date: Mar. 11, 2021

(65) Prior Publication Data
US 2021/0333659 A1 Oct. 28, 2021

(30) Foreign Application Priority Data
Sep. 4, 2019 (CN) .......................... 201910830961.8

(51) Int. Cl.
G02F 1/1343 (2006.01)
G02F 1/1339 (2006.01)
(52) U.S. Cl.
CPC .... *G02F 1/134363* (2013.01); *G02F 1/13394* (2013.01); *G02F 1/134372* (2021.01); *G02F 1/134381* (2021.01)

(58) Field of Classification Search
CPC ........... G02F 1/134363; G02F 1/13394; G02F 1/134372; G02F 1/134381
See application file for complete search history.

(56) References Cited

U.S. PATENT DOCUMENTS

| 7,038,754 B2 * | 5/2006 | Hirakata ............... G02F 1/1334 349/141 |
| 10,025,147 B2 | 7/2018 | Ma |
| 2011/0096255 A1 * | 4/2011 | Rho .................... C09K 19/0275 349/33 |
| 2013/0128207 A1 | 5/2013 | Nakano et al. |
| 2013/0293818 A1 | 11/2013 | Jung et al. |
| 2016/0115749 A1 | 4/2016 | McIntosh et al. |

FOREIGN PATENT DOCUMENTS

| CN | 104765207 A | 7/2015 |
| CN | 107656407 A | 2/2018 |
| CN | 109239989 A | 1/2019 |
| WO | 2012017931 A1 | 2/2012 |

* cited by examiner

*Primary Examiner* — Dung T Nguyen

(57) ABSTRACT

An array substrate and a display panel are provided. Each of sub-pixels is provided with a plurality of display domains. A first electrode retaining wall and a second electrode retaining wall are respectively disposed on both sides of the display domain, and the first electrode retaining wall is electrically connected to pixel electrodes. The second electrode retaining wall is electrically connected to common electrodes, and a horizontal electric field is generated between the first electrode retaining wall and the second electrode retaining wall, such that liquid crystal units in the display domain are aligned horizontally, thereby improving transmittance of the sub-pixels.

19 Claims, 4 Drawing Sheets

ARRAY SUBSTRATE AND LIQUID CRYSTAL PANEL

FIELD OF INVENTION

The present disclosure relates to the field of display technologies, and more particularly to an array substrate and a liquid crystal panel having the same.

BACKGROUND OF INVENTION

Liquid crystal displays (LCD) have many advantages such as thin body, power saving, no radiation, etc., and have been widely used.

Fringe field switching (FFS) liquid crystal display panels and in-plane switching (IPS) liquid crystal display panels are two mainstream liquid crystal display panels. Pixel electrodes driving liquid crystal units are all disposed on a side of an array substrate. As shown in FIG. 1A, a schematic structural diagram of an array substrate 10 in a liquid crystal display panel in FFS and IPS display modes is provided. Pixel electrodes 14 and common electrodes 13 are respectively disposed on two sides of a passivation layer 11, and the pixel electrodes 14 are in electrical contact with a drain electrode 12. As shown in FIG. 1B and FIG. 1C, a liquid crystal display panel includes an array substrate 10, a liquid crystal cell 20, and a color filter substrate 30. The pixel electrodes 14 and the common electrodes 13 in the array substrate 10 generate horizontal and vertical electric fields, which causes liquid crystal in the liquid crystal cell 20 to rotate in a direction and be arranged obliquely. In the liquid crystal panel of the above two display modes, electric field lines in the liquid crystal cell are distributed in an arc shape, and there are horizontally and vertically distributed electric fields. The horizontal electric field component is an effective component for display. The vertical electric field component causes the liquid crystal cell to stand up, and the vertical electric field and the horizontal electric field occupy a relatively large proportion. This causes a birefringence effect of a liquid crystal layer to weaken, resulting in a decrease in transmittance and affecting display performance of the liquid crystal panel.

SUMMARY OF INVENTION

An object of the present application is to provide an array substrate and a liquid crystal panel, which can solve technical problems that in the prior art, electric field lines in a liquid crystal cell of a liquid crystal pane are distributed in an arc shape, there are horizontally and vertically distributed electric fields, the horizontal electric field component is an effective component for display, the vertical electric field component causes the liquid crystal cell to stand up, and the vertical electric field and the horizontal electric field occupy a relatively large proportion, thereby causing a birefringence effect of a liquid crystal layer to weaken, resulting in a decrease in transmittance and affecting display performance of the liquid crystal panel.

In order to solve the foregoing issues, embodiments of the present application provide the following technical solutions to solve the foregoing issues.

An embodiment of the present invention provides a driving circuit, a driving method, and a display device, which are used to solve the technical problem that a current driving circuit has a large current on a common voltage line and damages a display screen.

To solve the above problems, the technical solutions provided in this application are as follows.

An embodiment of the present application provides an array substrate comprising sub-pixels. Each of the sub-pixels comprises: a substrate, pixel electrodes disposed above the substrate, common electrodes disposed above the pixel electrodes, and a first electrode retaining wall and a second electrode retaining wall which are arranged to be insulated from each other and are disposed above the common electrodes. The first electrode retaining wall is electrically connected to the pixel electrodes, and the second electrode retaining wall is electrically connected to the common electrodes.

In an embodiment of the present application, the sub-pixels comprise a first display domain, the first electrode retaining wall is disposed on a side of the first display domain near a driving transistor in the array substrate, and the second electrode retaining wall is disposed on a side of the first display domain away from the driving transistor.

In an embodiment of the present application, the sub-pixels comprise a second display domain and a third display domain, and the second display domain and the third display domain are arranged in a same row or in a same column, the first electrode retaining wall is disposed between the second display domain and the third display domain, and the second electrode retaining wall is disposed on both sides of the second display domain and the third display domain.

In an embodiment of the present application, the sub-pixels comprise a fourth display domain, a fifth display domain, a sixth display domain, and a seventh display domain, the first electrode retaining wall and the second electrode retaining wall are alternately disposed in the fourth display domain, the fifth display domain, the sixth display domain, and the seventh display domain.

In an embodiment of the present application, the fourth display domain, the fifth display domain, the sixth display domain, and the seventh display domain are arranged in a same row or in a same column.

In an embodiment of the present application, the fourth display domain and the fifth display domain are arranged in a same row, the sixth display domain and the seventh display domain are arranged in a same row, the fourth display domain and the sixth display domain are arranged in a same column, and the fifth display domain and the seventh display domain are arranged in a same column.

In an embodiment of the present application, the sub-pixels comprise an eighth display domain, a ninth display domain, a tenth display domain, an eleventh display domain, a twelfth display domain, a thirteenth display domain, a fourteenth display domain, and a fifteenth display domain. The first electrode retaining wall and the second electrode retaining wall are alternately arranged in the eighth display domain, the ninth display domain, the tenth display domain, the eleventh display domain, the twelfth display domain, the thirteenth display domain, the fourteenth display domain, and the fifteenth display domain.

In an embodiment of the present application, the eighth display domain, the ninth display domain, the tenth display domain, the eleventh display domain, the twelfth display domain, the thirteenth display domain, the fourteenth display domain, and the fifteenth display domain are arranged in a same row or in a same column.

In an embodiment of the present application, the eighth display domain, the ninth display domain, the tenth display domain, and the eleventh display domain are arranged in a same row, the twelfth display domain, the thirteenth display domain, the fourteenth display domain, and the fifteenth display domain are arranged in a same row, the eighth display domain and the twelfth display domain are arranged in a same column, the ninth display domain and the thirteenth display domain are arranged in a same column, the tenth display domain and the fourteenth display domain are arranged in a same column, and the eleventh display domain and the fifteenth display domain are arranged in a same column.

In an embodiment of the present application, the second electrode retaining wall is shared by adjacent sub-pixels.

In an embodiment of the present application, each of the first electrode retaining wall and the second electrode retaining wall comprises a spacer and a conductive layer wrapped on a surface of the spacer.

In an embodiment of the present application, the first electrode retaining wall and the second electrode retaining wall have a same shape.

In an embodiment of the present application, the first electrode retaining wall and the second electrode retaining wall are both rectangular parallelepipeds.

In an embodiment of the present application, the first electrode retaining wall and the second electrode retaining wall are disposed on opposite boundaries of sub-pixel partitions in the array substrate, respectively.

In an embodiment of the present application, a layer in which a drain electrode is disposed in the array substrate is a same layer as the pixel electrodes, and adjacent ends of the pixel electrodes and the drain electrode are in electrical contact.

In an embodiment of the present application, a voltage value of a pixel branch electrode corresponding to a display domain in the sub-pixels is adjusted synchronously by a same thin film transistor.

In an embodiment of the present application, the pixel branch electrode comprises a first trunk electrode, a second trunk electrode, and a connection electrode.

In an embodiment of the present application, the connection electrode is ring-shaped and comprises one or more shapes of rectangular, quadrangular, trapezoidal, and irregular shapes.

In an embodiment of the present application, the common electrodes are spaced above the pixel electrodes.

An embodiment of the present application further provides a liquid crystal panel comprising the above array substrate, a liquid crystal cell, and a color filter substrate. The liquid crystal cell is provided with a plurality of liquid crystal units and is disposed in a display domain of the array substrate, a horizontal electric field is generated by the first electrode retaining wall and the second electrode retaining wall on both sides of the display domain, such that the liquid crystal units are aligned horizontally under action of the horizontal electric field.

Beneficial effects of the present application are that in an embodiment of the present application, one sub-pixel includes one or more display domains to improve resolution of a liquid crystal panel. A first electrode retaining wall and a second electrode retaining wall are provided in a boundary gap of each display domain, which will not affect transmittance of the sub-pixel. The first electrode retaining wall and the second electrode retaining wall generate a horizontal electric field, which effectively reduces a ratio of a vertical electric field and a horizontal electric field generated by sub-pixel electrodes and common electrodes in the display domain in the array substrate. This ensures that liquid crystal units disposed in the display domain are aligned horizontally, thereby increasing transmittance of the sub-pixel. Adjacent sub-pixel partitions share a second electrode retaining wall, and pixel electrodes are connected to branch electrodes in each display domain through a via hole, thereby realizing normal display of the liquid crystal panel.

DESCRIPTION OF DRAWINGS

In order to explain the technical solutions in the embodiments of the present application more clearly, the drawings used in the description of the embodiments will be briefly introduced below. Obviously, the drawings in the following description are only some embodiments of the present application. For those skilled in the art, other drawings can be obtained based on these drawings without paying creative efforts.

DETAILED DESCRIPTION OF PREFERRED EMBODIMENTS

The following describes the present application in detail with reference to the accompanying drawings and embodiments. It is particularly pointed out that the following examples are only used to illustrate the present application, but not to limit the scope of the present application. Similarly, the following embodiments are only some of the embodiments of the present application, but not all the embodiments. All other embodiments obtained by a person of ordinary skill in the art without creative efforts shall fall within the protection scope of the present application.

In the prior art, electric field lines in a liquid crystal cell of a liquid crystal pane are distributed in an arc shape, there are horizontally and vertically distributed electric fields, the horizontal electric field component is an effective component for display, the vertical electric field component causes the liquid crystal cell to stand up, and the vertical electric field and the horizontal electric field occupy a relatively large proportion, thereby causing a birefringence effect of a liquid crystal layer to weaken, resulting in a decrease in transmittance and affecting display performance of the liquid crystal panel. Embodiments of the present application can solve this defect.

Figure 1A:
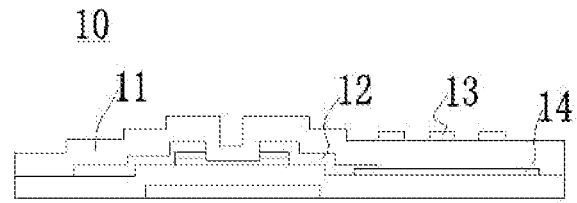
FIG. 1A is a schematic structural diagram of an array substrate in the prior art.
Figure 1B:
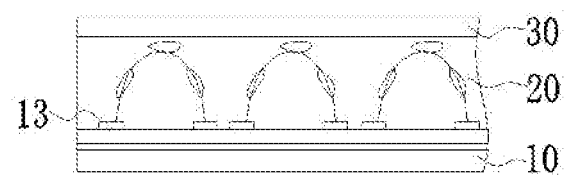
FIG. 1B is a schematic diagram of an electric field distribution in a liquid crystal cell of a liquid crystal panel in the prior art.
Figure 1C:
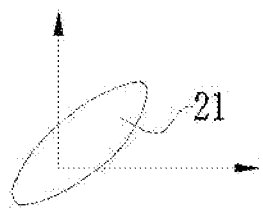
FIG. 1C is a schematic diagram of an arrangement of liquid crystal units in a liquid crystal cell of a liquid crystal panel in the prior art.
Figure 2A:
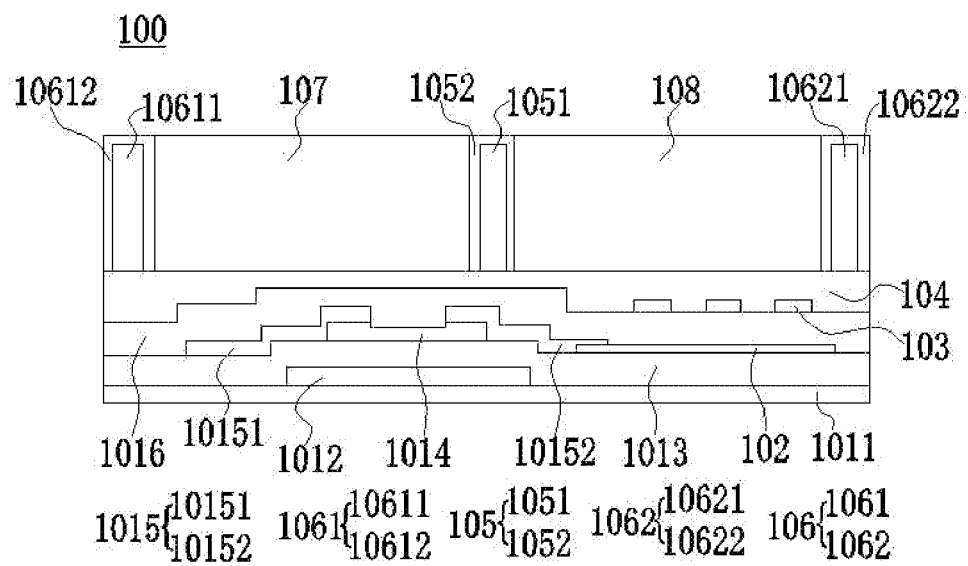
FIG. 2A is a schematic structural diagram of an array substrate according to an embodiment of the present application.

As shown in FIG. 2A, an embodiment of the present application provides an array substrate 100. The array substrate 100 forms sub-pixels. Each of the sub-pixels comprises: a substrate 1011, pixel electrodes 102 disposed above the substrate 1011, common electrodes 103 disposed above the pixel electrodes 102, and a first electrode retaining wall 105 and a second electrode retaining wall 106 which are arranged to be insulated from each other and are disposed above the common electrodes 103. The first electrode retaining wall 105 is electrically connected to the pixel electrodes 102, and the second electrode retaining wall 106 is electrically connected to the common electrodes 103.

In an embodiment, the pixel unit includes at least one sub-pixel. The sub-pixel includes a second display domain 107 and a third display domain 108. The second electrode retaining wall 106 includes a first sub-electrode retaining wall 1061 and a second sub-electrode retaining wall 1062. The first electrode retaining wall 105 is disposed between the second display domain 107 and the third display domain 108 and is close to a side of a driving transistor in the array substrate 100. The second electrode retaining wall 106 is disposed on both sides of the second display domain 107 and the third display domain 108 and is far from a side of the driving transistor in the array substrate 100. Adjacent sub-pixels share adjacent second electrode retaining walls 106. The first electrode retaining wall 105 is disposed between the first sub-electrode retaining wall 1061 and the second sub-electrode retaining wall 1062. A horizontal electric field is generated between the first electrode retaining wall 105 and the first sub-electrode retaining wall 105. A horizontal electric field is generated between the first electrode retaining wall 105 and the second sub-electrode retaining wall 1062. According to the actual needs of resolution of the array substrate 100, the sub-pixels may also be set as one or more display domains. The first electrode retaining wall 105 and the second electrode retaining wall 106 are alternately disposed in one or more display domains.

Specifically, an embodiment of the present application provides a schematic structural diagram of an array substrate 100. The array substrate 100 further includes a substrate 1011, a gate 1012, a gate insulating layer 1013, an active layer 1014, a source/drain layer 1015, a pixel electrode 102, a passivation layer 1016, a common electrode 103, a protective layer 104, the first electrode retaining wall 105, and the second electrode retaining wall 106.

The substrate 1011 is usually a glass substrate, and may be a substrate of other materials, which is not limited herein. The gate layer 1012 is formed on a substrate 1011. The gate layer 1012 is formed on the substrate 1011 by a physical vapor deposition method, and then a gate pattern is formed through a photolithography process. Material of the gate layer 1012 may be a metal material, such as copper (Cu), aluminum (Al), titanium (Ti), tantalum (Ta), tungsten (W), molybdenum (Mo), chromium (Cr), or the like.

The gate insulating layer 1013 is formed on the gate layer 1012 and covers the gate layer 1012 and the substrate 1011. The gate insulating layer 1013 is formed on the gate layer 1012 by a chemical vapor deposition method, and then annealed in a dry air atmosphere at 400° C. Material of the gate insulating layer 1013 is generally a sandwich structure of silicon oxide (SiOx) and silicon nitride (SiNx).

The active layer 1014 is formed on the gate insulating layer 1013 and is disposed to be insulated from the gate layer 1012. The active layer 1014 is deposited on the gate insulating layer 1013 by a magnetron sputtering method, a metal organic chemical vapor deposition method, or a pulse laser evaporation method. After deposition of the active layer 1014 is completed, an annealing process is performed, and the annealing process can be performed in a dry air atmosphere at 400° C. for about 0.5 hours. After the annealing process is completed, the active layer 1014 is etched by a wet etching process or a dry etching process using oxalic acid as an etching solution. After the etching process, an entire metal oxide film is patterned to form an island-shaped metal oxide semiconductor layer.

The source/drain layer 1015 is disposed on both sides of the active layer 1014. The source/drain layer 1015 includes a source electrode 10151 and a drain electrode 10152. The source electrode 10151 and the drain electrode 10152 are electrically connected to corresponding positions of the active layer 1014, respectively. A layer where the drain electrode 10152 is disposed is the same layer as the pixel electrode 102, and adjacent ends of the pixel electrode 102 and the drain electrode 10152 are in electrical contact.

The passivation layer 1016 is formed on the source/drain layer 1015. Material of the passivation layer 1016 may be silicon oxide (SiOx), silicon nitride (SiNx), or an interlayer structure of the two. The pixel electrode 102 is in electrical contact with the sub-pixel electrode retaining wall 106 through a via hole.

A plurality of spaced apart common electrodes 103 are formed above the pixel electrode 102, and the common electrodes 103 are disposed on a surface of the passivation layer 1016. The common electrodes 103 are in electrical contact with the gate layer 1012. A surface of the common electrode 103 is provided with a protective layer 104, and the protective layer 104 covers the passivation layer 1016.

The surface of the protective layer 104 is provided with a first electrode retaining wall 105 and a second electrode retaining wall 106. The first electrode retaining wall 105 and the second electrode retaining wall 106 are both perpendicular to the protective layer 104 and extend upward to a preset position. Each of the first electrode retaining wall 105 and the second electrode retaining wall 106 includes a spacer and a conductive layer on the surface of the spacer. The conductive layers are preferably provided in the same layer and integrally formed. In this embodiment, the shapes of the first electrode retaining wall 105 and the second electrode retaining wall 106 are preferably the same. The first electrode retaining wall 105 includes a first spacer 1051 and a first conductive layer 1052. The second electrode retaining wall 106 includes a first sub-electrode retaining wall 1061 and a second sub-electrode retaining wall 1062. The first sub-electrode retaining wall 1061 includes a second spacer 10611 and a second electrode layer 10612. The second sub-electrode retaining wall 1062 includes a third spacer 10621 and a third electrode layer 10622. In order to generate a horizontal electric field, the first electrode retaining wall 105 and the second electrode retaining wall 106 are preferably rectangular parallelepipeds, and the two are arranged in parallel, spaced, and alternately. A second electrode retaining wall 106 is disposed between any two adjacent first electrode retaining walls 105. A first electrode retaining wall 105 is disposed between any two adjacent second electrode retaining walls 106.

In this embodiment, the second electrode retaining wall 106 is disposed on both sides of the second display domain 107 and the third display domain 108 in the sub-pixel. The second electrode retaining wall 106 is in electrical contact with the common electrode 103 through a via hole on the protective layer. The first electrode retaining wall 105 is in electrical contact with the pixel electrode 102 through a via hole on the passivation layer and the protective layer. Adjacent sub-pixels share the second electrode retaining wall 106. The second electrode retaining wall 106 is placed in a non-opening area, and the first electrode retaining wall 105 is disposed at a boundary of the pixel domain. That is, the first electrode retaining wall 105 and the second electrode retaining wall 106 are respectively disposed on opposite boundaries of the sub-pixel partitions in the array substrate. Therefore, the effect of the first electrode retaining wall 105 and the second electrode retaining wall 106 on the pixel transmittance is low. The first electrode retaining wall 105 and the second electrode retaining wall 106 form a horizontal electric field in the display domain. This effectively reduces a ratio of the vertical electric field and the horizontal electric field generated by the pixel electrode and the common electrode in the display domain in the array substrate. This ensures that the liquid crystal units in the display domain are aligned horizontally, thereby increasing the sub-pixel transmittance. The common electrode retaining wall is shared by adjacent sub-pixel partitions. The pixel electrode is connected to the branch electrode in each display domain through a via hole, thereby realizing normal operation of the array substrate.

Figure 2B:
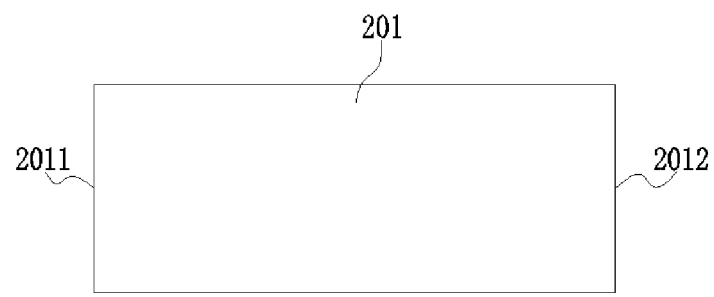
FIG. 2B is a schematic structural diagram of a display domain in an array substrate according to an embodiment of the present application.

As shown in FIG. 2B, an embodiment of the present application provides a schematic structural diagram of a display domain in an array substrate. The sub-pixel includes a first display domain 201. A boundary gap 2011 of the first display domain 201 is provided with a second retaining wall 106. A boundary gap 2012 of the first display domain 201 is provided with a first electrode retaining wall 105. The first electrode retaining wall 105 is disposed on a side of the first display domain 201 near the driving transistor in the array substrate. The second electrode retaining wall 106 is disposed on a side of the first display domain 201 away from the driving transistor. A horizontal electric field is generated between the first electrode retaining wall 105 and the second electrode retaining wall 106.

Figure 2C:
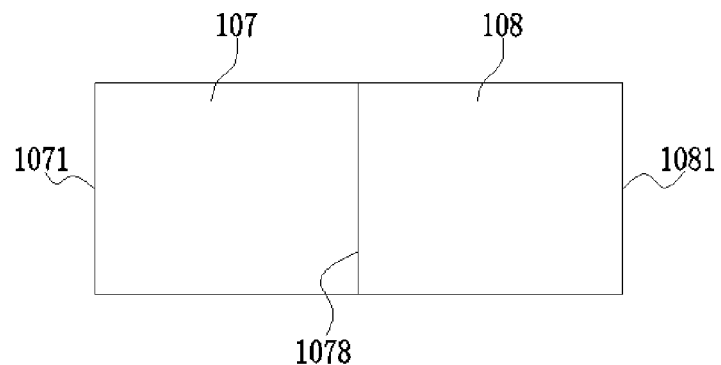
FIG. 2C is a schematic structural diagram of two display domains in an array substrate according to an embodiment of the present application.

As shown in FIG. 2C, an embodiment of the present application provides a schematic structural diagram of two display domains in an array substrate. The sub-pixel includes a second display domain 107 and a third display domain 108. The second display domain 107 and the third display domain 108 are arranged in parallel. The first electrode retaining wall 105 is disposed on a boundary gap 1078 between the second display domain 107 and the third display domain 108. The second electrode retaining wall 106 is disposed on a side boundary gap 1071 of the second display domain 107 and a side boundary gap 1081 of the third display domain 108, respectively. A horizontal electric field is generated between adjacent first electrode retaining wall 105 and second electrode retaining wall 106. A display domain arrangement of this embodiment is not limited to the same row, but may be the same column.

Figure 2D:
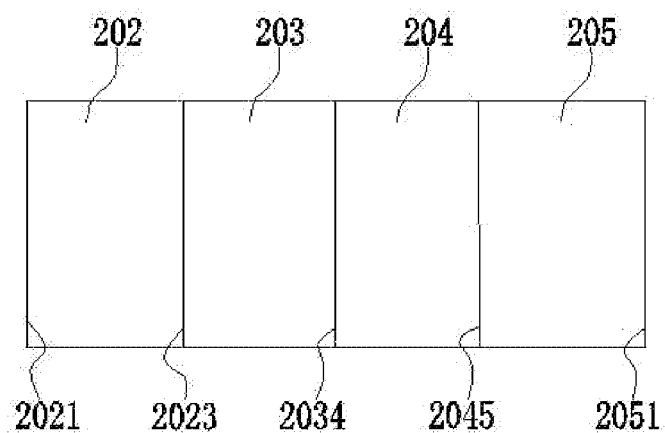
FIG. 2D is a schematic structural diagram of four display domains in an array substrate according to an embodiment of the present application.

As shown in FIG. 2D, an embodiment of the present application provides a schematic structural diagram of four display domains in an array substrate. The sub-pixel includes a fourth display domain 202, a fifth display domain 203, a sixth display domain 204, and a seventh display domain 205. The fourth display domain 202, the fifth display domain 203, the sixth display domain 204, and the seventh display domain 205 are in the same row. The second electrode retaining wall 106 is disposed on the boundary gap 2021, the first electrode retaining wall 105 is disposed on the boundary gap 2023, the second electrode retaining wall 106 is disposed on the boundary gap 2034, and the first electrode retaining wall 105 is disposed on the boundary gap 2045. The second electrode retaining wall 106 is disposed on the boundary gap 2051. A horizontal electric field is generated between the adjacent first electrode retaining wall 105 and the second electrode retaining wall 106. This embodiment shows that the domain arrangement is not limited to the same row but may be the same column.

Figure 2E:
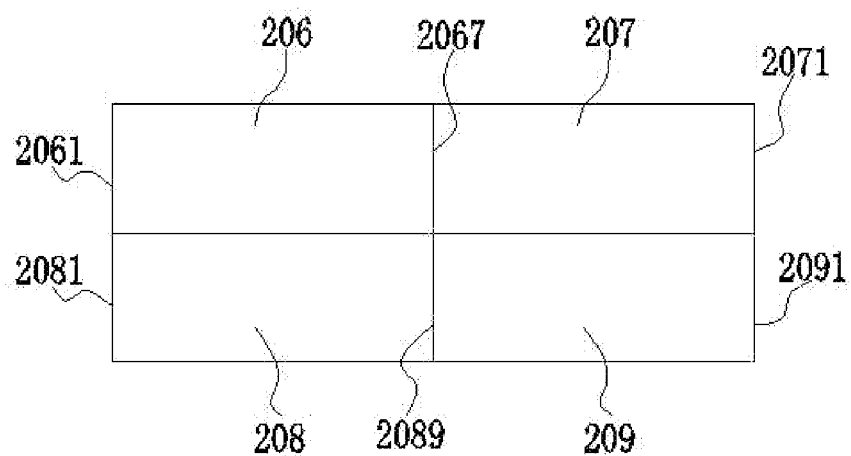
FIG. 2E is another schematic structural diagram of four display domains in an array substrate according to an embodiment of the present application.

As shown in FIG. 2E, an embodiment of the present application provides another structural diagram of four display domains in an array substrate. The sub-pixels include a fourth display domain 206, a fifth display domain 207, a sixth display domain 208, and a seventh display domain 209. The fourth display domain 206 and the fifth display domain 207 are arranged in the same row, the sixth display domain 208 and the seventh display domain 209 are arranged in the same row, the fourth display domain 206 and the sixth display domain 208 are arranged in the same column, and the fifth display domain 207 is provided in the same column as the seventh display domain 209.

The second electrode retaining wall 106 is disposed on the boundary gap 2061, the first electrode retaining wall 105 is disposed on the boundary gap 2067, the second electrode retaining wall 106 is disposed on the boundary gap 2071, and the second electrode retaining wall 106 is disposed on the boundary gap 2081. The first electrode retaining wall 105 is disposed on the boundary gap 2089, and the second electrode retaining wall 106 is disposed on the boundary gap 2091. A horizontal electric field is generated between the adjacent first electrode retaining wall 105 and the second electrode retaining wall 106.

Figure 2F:
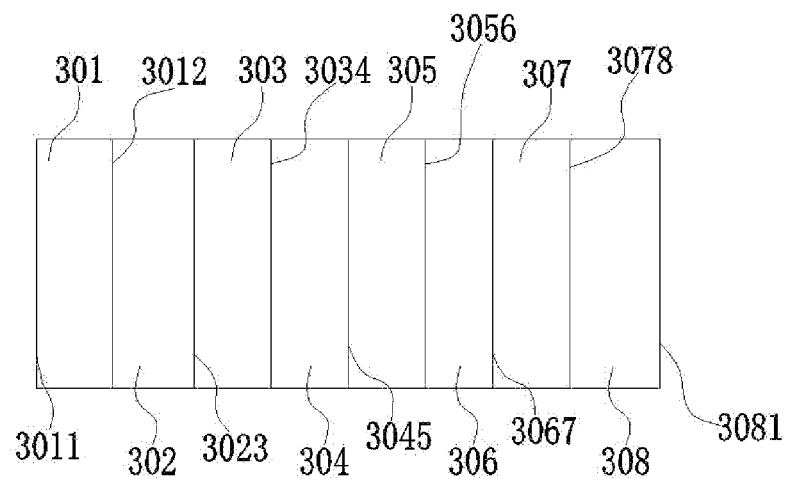
FIG. 2F is a schematic structural diagram of eight display domains in an array substrate according to an embodiment of the present application.

As shown in FIG. 2F, an embodiment of the present application provides a schematic structural diagram of eight display domains in an array substrate. The sub-pixels include an eighth display domain 301, a ninth display domain 302, a tenth display domain 303, an eleventh display domain 304, a twelfth display domain 305, a thirteenth display domain 306, a fourteenth display domain 307, and a fifteen display domain 308. Eighth display domain 301, ninth display domain 302, tenth display domain 303, eleventh display domain 304, twelfth display domain 305, thirteenth display domain 306, fourteenth display domain 307, and fifteenth display domain 308 are arranged in the same row.

The second electrode retaining wall 106 is disposed on the boundary gap 3011, and the first electrode retaining wall 105 is disposed on the boundary gap 3012. The second electrode retaining wall 106 is disposed on the boundary gap 3023, and the first electrode retaining wall 105 is disposed on the boundary gap 3034. The second electrode retaining wall 106 is disposed on the boundary gap 3045, and the first electrode retaining wall 105 is disposed on the boundary gap 3056. The second electrode retaining wall 105 is disposed on the boundary gap 3067, and the first electrode retaining wall 106 is disposed on the boundary gap 3078. The second electrode retaining wall 105 is disposed on the boundary gap 3081. A horizontal electric field is generated between the adjacent first electrode retaining wall 105 and the second electrode retaining wall 106. This embodiment shows that the domain arrangement is not only in the same row, but also in the same column.

Figure 2G:
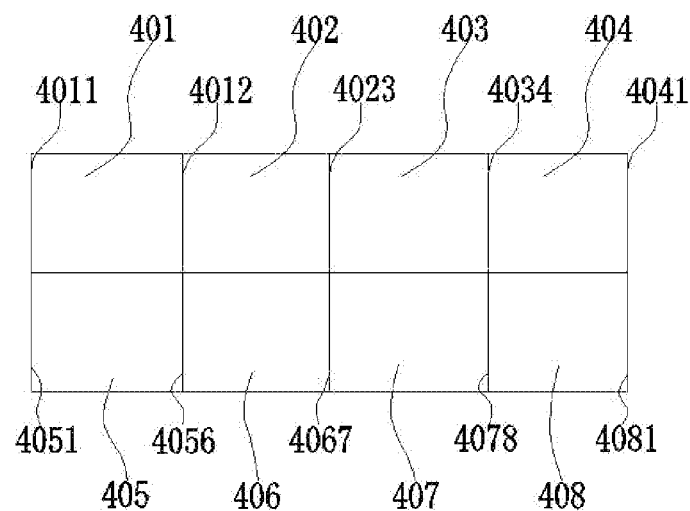
FIG. 2G is another schematic structural diagram of eight display domains in an array substrate according to an embodiment of the present application.

As shown in FIG. 2G, an embodiment of the present application provides another schematic structural diagram of eight display domains in an array substrate. The sub-pixel includes an eighth display domain 401, a ninth display domain 402, a tenth display domain 403, an eleventh display domain 404, a twelfth display domain 405, a thirteenth display domain 406, a fourteenth display domain 407, and a fifteen display domain 408. The eighth display domain 401, the ninth display domain 402, the tenth display domain 403, and the eleventh display domain 404 are arranged in the same row. The twelfth display domain 405, the thirteenth display domain 406, the fourteenth display domain 407, and the fifteenth display domain 408 are arranged in the same row. The eighth display domain 401 and the twelfth display domain 405 are arranged in the same column. The ninth display domain 402 and the thirteenth display domain 406 are arranged in the same column. The tenth display domain 403 and the fourteenth display domain 407 are arranged in the same column. The eleventh display domain 404 and the fifteenth display domain 408 are arranged in the same column.

The second electrode retaining wall 106 is disposed on the boundary gap 4011, and the first electrode retaining wall 105 is disposed on the boundary gap 4012. The second electrode retaining wall 106 is disposed on the boundary gap 4023, and the first electrode retaining wall 105 is disposed on the boundary gap 4034. The second electrode retaining wall 106 is disposed on the boundary gap 4041, and the second electrode retaining wall 106 is disposed on the boundary gap 4051. The first electrode retaining wall 105 is disposed on the boundary gap 4056, and the second electrode retaining wall 106 is disposed on the boundary gap 4067. The first electrode retaining wall 105 is disposed on the boundary gap 4078, and the second electrode retaining wall 106 is disposed on the boundary gap 4081. A horizontal electric field is generated between the adjacent first electrode retaining wall 105 and the second electrode retaining wall 106.

Figure 3:
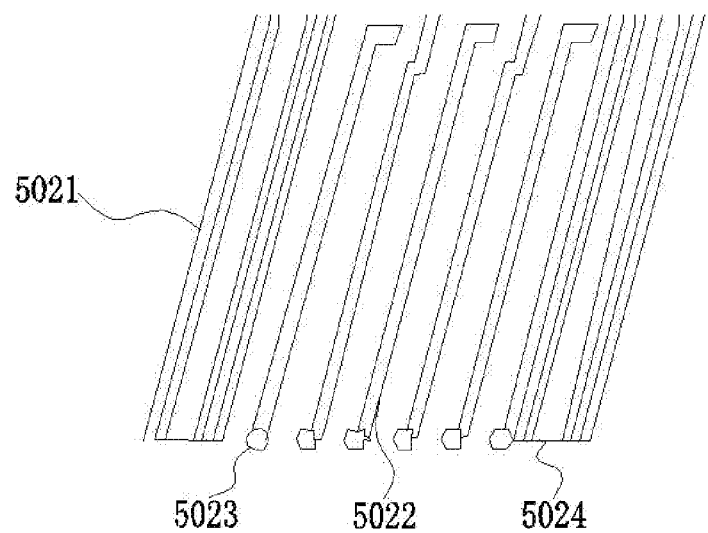
FIG. 3 is a schematic structural diagram of a branch electrode in a display domain in an array substrate according to an embodiment of the present application.

As shown in FIG. 3, an embodiment of the present application provides a schematic structural diagram of a branch electrode in a display domain of an array substrate. The branch electrode includes a first trunk electrode 5021, a second trunk electrode 5022, a first connection electrode 5023, and a second connection electrode 5024. The first trunk electrode 5021 and the second trunk electrode 5022 are overlapped. The first connection electrode 5023 and the second connection electrode 5024 respectively connect branch electrodes in adjacent display domains, and function as a bridge. The first connection electrode 5023 is ring-shaped and includes one or more of rectangular, quadrangular, trapezoidal, and irregular shapes. The second connection electrode 5024 includes one or more of a straight line and a curved line. Preferably, the voltage value of the branch electrode of the pixel corresponding to the display domain in the same sub-pixel is adjusted synchronously by the same thin film transistor or may be adjusted by multiple thin film transistors.

According to the above object of the present application, an embodiment of the present application provides a liquid crystal panel comprising the above array substrate, a liquid crystal cell, and a color filter substrate. The liquid crystal cell is provided with a plurality of liquid crystal units and is disposed in a display domain of the array substrate, a horizontal electric field is generated by the first electrode retaining wall and the second electrode retaining wall on both sides of the display domain, such that the liquid crystal units are aligned horizontally under action of the horizontal electric field.

Figure 4:
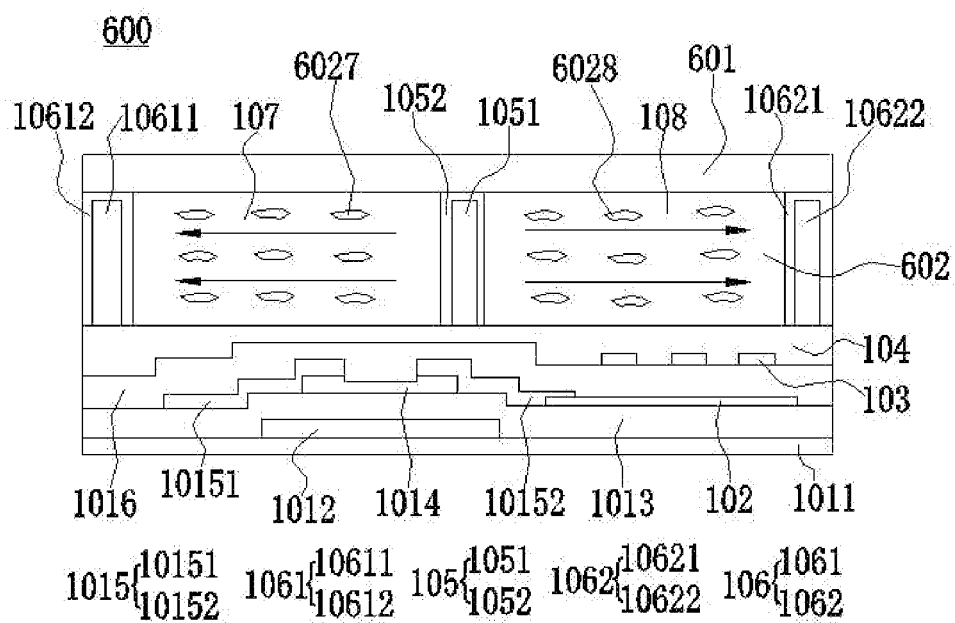
FIG. 4 is a schematic structural diagram of a liquid crystal panel according to an embodiment of the present application.

As shown in FIG. 4, an embodiment of the present application provides a schematic structural diagram of a liquid crystal panel 600. The liquid crystal panel 600 includes an array substrate, a color filter substrate 601, and a liquid crystal cell 602 disposed between the array substrate and the color filter substrate 601. The color filter substrate 601 includes a color resist layer. The liquid crystal cell 602 includes a plurality of liquid crystal units. The liquid crystal units are arranged horizontally under action of a horizontal electric field generated by the first retaining wall and the second retaining wall in the array substrate.

The array substrate includes a substrate 1011, a gate 1012, a gate insulating layer 1013, an active layer 1014, a source/drain layer 1015, a pixel electrode 102, a passivation layer 1016, a common electrode 103, a protective layer 104, the first electrode retaining wall 105, and the second electrode retaining wall 106 which are stacked from bottom to top. The first electrode retaining wall 105 and the second electrode retaining wall 106 are insulated from each other and disposed above the common electrode 103. The first electrode retaining wall 105 is electrically connected to the pixel electrode 102, and the second electrode retaining wall 106 is electrically connected to the common electrode 103. The second electrode retaining wall 106 includes a first sub-electrode retaining wall 1061 and a second sub-electrode retaining wall 1062.

The liquid crystal cell 602 includes a first liquid crystal partition and a second liquid crystal partition. The first liquid crystal partition and the second liquid crystal partition overlap the second display domain 107 and third display domain 108, respectively. The liquid crystals 6027 in the first liquid crystal partition are arranged horizontally under the action of a horizontal electric field generated by the first sub-electrode retaining wall 1061 and the first sub-electrode retaining wall 105. The liquid crystal units 6028 in the second liquid crystal partition are arranged horizontally under the action of the horizontal electric field generated by the second sub-electrode retaining wall 1062 and the first electrode retaining wall 105. This improves transmittance of the sub-pixels and ensures display performance of the liquid crystal panel 600.

In an embodiment of the present application, one sub-pixel includes one or more display domains to improve resolution of a liquid crystal panel. A first electrode retaining wall and a second electrode retaining wall are provided in a boundary gap of each display domain, which will not affect transmittance of the sub-pixel. The first electrode retaining wall and the second electrode retaining wall generate a horizontal electric field, which effectively reduces a ratio of a vertical electric field and a horizontal electric field generated by sub-pixel electrodes and common electrodes in the display domain in the array substrate. This ensures that liquid crystal units disposed in the display domain are aligned horizontally, thereby increasing transmittance of the sub-pixel. Adjacent sub-pixel partitions share a second electrode retaining wall, and pixel electrodes are connected to branch electrodes in each display domain through a via hole, thereby realizing normal display of the liquid crystal panel.

In summary, although the present application has been disclosed above with preferred embodiments, the above preferred embodiments are not intended to limit the present application. Those of ordinary skill in the art can make various modifications and improvements without departing from the spirit and scope of the present application. Therefore, the protection scope of the present application is subject to the scope defined by the claims.

What is claimed is:
1. An array substrate, comprising:
sub-pixels, wherein each of the sub-pixels comprises:

a substrate;

pixel electrodes disposed above the substrate;

common electrodes disposed above the pixel electrodes; and a first electrode retaining wall and a second electrode retaining wall which are arranged to be insulated from each other and are disposed above the common electrodes;

wherein the first electrode retaining wall is electrically connected to the pixel electrodes, and the second electrode retaining wall is electrically connected to the common electrodes;

wherein the sub-pixels comprise a first display domain, the first electrode retaining wall is disposed on a side of the first display domain near a driving transistor in the array substrate, and the second electrode retaining wall is disposed on a side of the first display domain away from the driving transistor.

2. The array substrate according to claim 1, wherein the sub-pixels comprise a second display domain and a third display domain, and the second display domain and the third display domain are arranged in a same row or in a same column;

wherein the first electrode retaining wall is disposed between the second display domain and the third display domain, and the second electrode retaining wall is disposed on both sides of the second display domain and the third display domain.

3. The array substrate according to claim 1, wherein the sub-pixels comprise a fourth display domain, a fifth display domain, a sixth display domain, and a seventh display domain;

wherein the first electrode retaining wall and the second electrode retaining wall are alternately disposed in the fourth display domain, the fifth display domain, the sixth display domain, and the seventh display domain.

4. The array substrate according to claim 3, wherein the fourth display domain, the fifth display domain, the sixth display domain, and the seventh display domain are arranged in a same row or in a same column.

5. The array substrate according to claim 3, wherein the fourth display domain and the fifth display domain are arranged in a same row, the sixth display domain and the seventh display domain are arranged in a same row, the fourth display domain and the sixth display domain are arranged in a same column, and the fifth display domain and the seventh display domain are arranged in a same column.

6. The array substrate according to claim 1, wherein the sub-pixels comprise an eighth display domain, a ninth display domain, a tenth display domain, an eleventh display domain, a twelfth display domain, a thirteenth display domain, a fourteenth display domain, and a fifteenth display domain;

wherein the first electrode retaining wall and the second electrode retaining wall are alternately arranged in the eighth display domain, the ninth display domain, the tenth display domain, the eleventh display domain, the twelfth display domain, the thirteenth display domain, the fourteenth display domain, and the fifteenth display domain.

7. The array substrate according to claim 6, wherein the eighth display domain, the ninth display domain, the tenth display domain, the eleventh display domain, the twelfth display domain, the thirteenth display domain, the fourteenth display domain, and the fifteenth display domain are arranged in a same row or in a same column.

8. The array substrate according to claim 6, wherein the eighth display domain, the ninth display domain, the tenth display domain, and the eleventh display domain are arranged in a same row, the twelfth display domain, the thirteenth display domain, the fourteenth display domain, and the fifteenth display domain are arranged in a same row, the eighth display domain and the twelfth display domain are arranged in a same column, the ninth display domain and the thirteenth display domain are arranged in a same column, the tenth display domain and the fourteenth display domain are arranged in a same column, and the eleventh display domain and the fifteenth display domain are arranged in a same column.

9. The array substrate according to claim 1, wherein the second electrode retaining wall is shared by adjacent sub-pixels.

10. The array substrate according to claim 1, wherein each of the first electrode retaining wall and the second electrode retaining wall comprises a spacer and a conductive layer wrapped on a surface of the spacer.

11. The array substrate according to claim 10, wherein the first electrode retaining wall and the second electrode retaining wall have a same shape.

12. The array substrate according to claim 11, wherein the first electrode retaining wall and the second electrode retaining wall are both rectangular parallelepipeds.

13. The array substrate according to claim 1, wherein the first electrode retaining wall and the second electrode retaining wall are disposed on opposite boundaries of sub-pixel partitions in the array substrate, respectively.

14. The array substrate according to claim 1, wherein a layer in which a drain electrode is disposed in the array substrate is a same layer as the pixel electrodes, and adjacent ends of the pixel electrodes and the drain electrode are in electrical contact.

15. The array substrate according to claim 1, wherein a voltage value of a pixel branch electrode corresponding to a display domain in the sub-pixels is adjusted synchronously by a same thin film transistor.

16. The array substrate according to claim 15, wherein the pixel branch electrode comprises a first trunk electrode, a second trunk electrode, and a connection electrode.

17. The array substrate according to claim 16, wherein the connection electrode is ring-shaped and comprises one or more shapes of rectangular, quadrangular, trapezoidal, and irregular shapes.

18. The array substrate according to claim 1, wherein the common electrodes are spaced above the pixel electrodes.

19. A liquid crystal panel, comprising:

the array substrate according to claim 1, a liquid crystal cell, and a color filter substrate; wherein the liquid crystal cell is provided with a plurality of liquid crystal units and is disposed in a display domain of the array substrate, a horizontal electric field is generated by the first electrode retaining wall and the second electrode retaining wall on both sides of the display domain, such that the liquid crystal units are aligned horizontally under action of the horizontal electric field.

* * * * *